United States Patent [19]

Smith

[11] 4,131,842

[45] Dec. 26, 1978

[54] AUTOMATIC SPRING-POWERED BATTERY CHARGING DEVICE

[76] Inventor: James Smith, 2503 Prospect, Kansas City, Mo. 64127

[21] Appl. No.: 800,415

[22] Filed: May 25, 1977

[51] Int. Cl.² ........................... H02J 7/00; F03G 1/00
[52] U.S. Cl. .................................... 320/61; 185/40 B; 290/1 E; 322/38
[58] Field of Search ..................... 320/61; 322/35, 38, 322/40–43; 58/28 D; 290/1 E; 185/40 B, 40 H, 43

[56] References Cited

U.S. PATENT DOCUMENTS

| 778,133 | 12/1904 | Keates | 322/42 X |
|---|---|---|---|
| 903,762 | 11/1908 | Paulson | 185/40 H |
| 1,520,418 | 12/1924 | Hurlbut | 185/40 B |
| 1,920,479 | 8/1933 | Poole | 185/40 B |
| 3,861,487 | 1/1975 | Gill | 320/61 X |

FOREIGN PATENT DOCUMENTS

| 2353714 | 10/1973 | Fed. Rep. of Germany | 322/40 |
|---|---|---|---|
| 450224 | 4/1935 | United Kingdom | 290/1 E |
| 514351 | 1/1938 | United Kingdom | 320/61 |

*Primary Examiner*—Robert J. Hickey
*Attorney, Agent, or Firm*—Lowe, Kokjer, Kircher, Wharton & Bowman

[57] ABSTRACT

A battery charging mechanism which is driven by a coil spring. A gear train driven by the spring includes a wheel having peripheral teeth. A control lever is reciprocated pivotally by a small spring to engage the teeth of the wheel in a manner to control its rotation. The wheel in turn applies impulses which help to keep the lever in motion. Links connected with the lever turn gears which drive alternators in order to deliver charging current to the battery. An electric motor acts to automatically wind up the drive spring when it has uncoiled below a preselected tension level.

5 Claims, 2 Drawing Figures

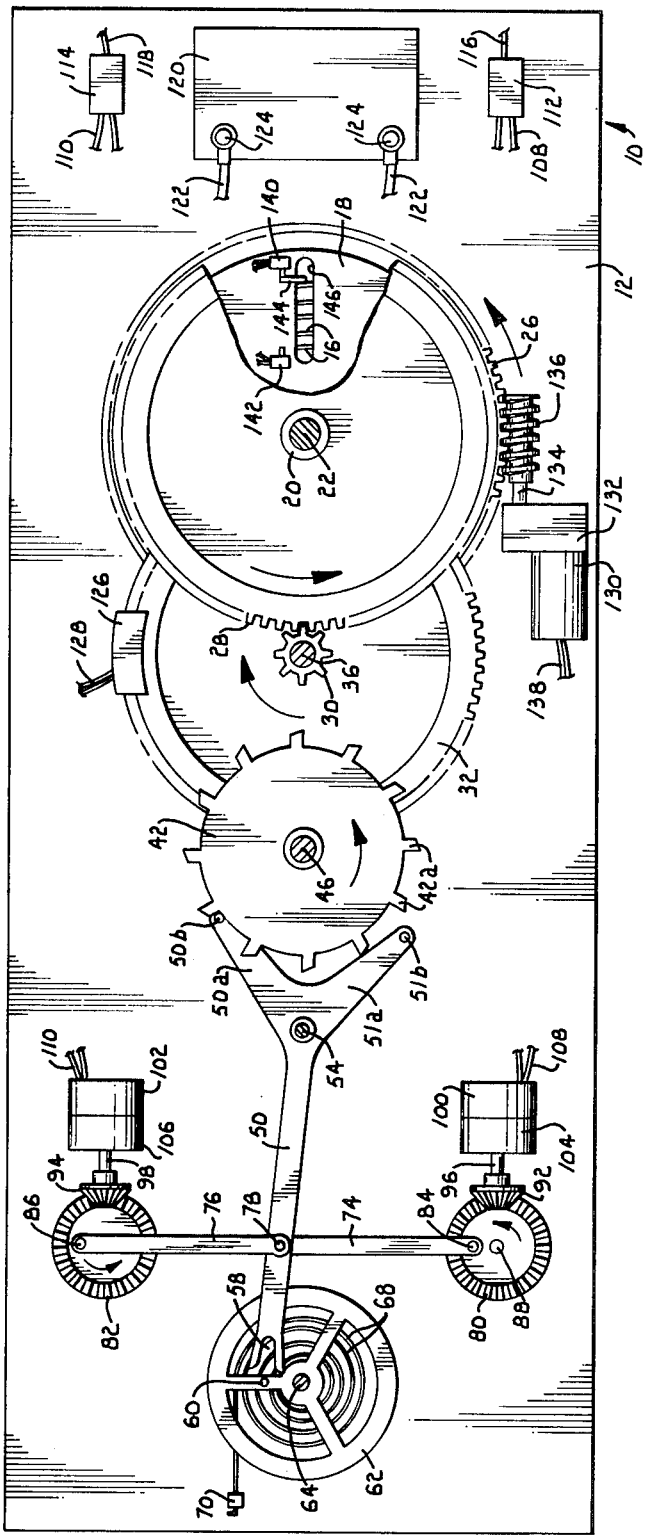
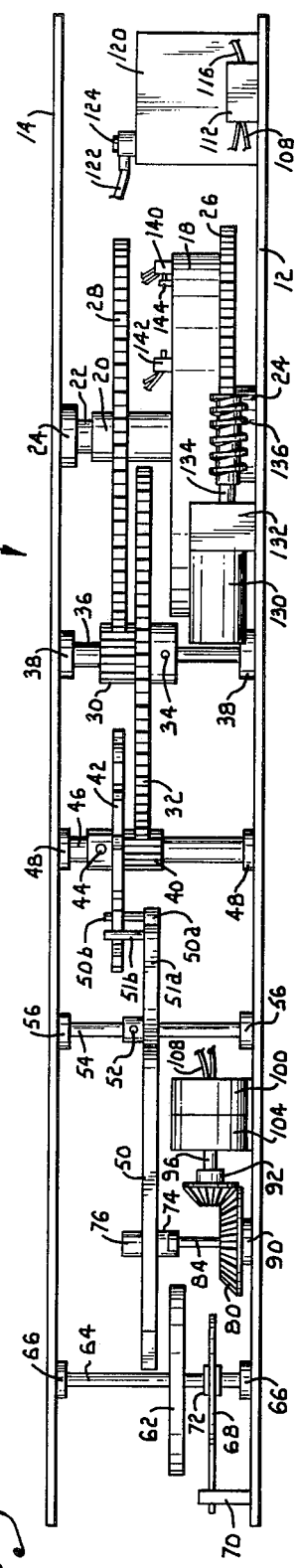
Fig. 1.
Fig. 2.

AUTOMATIC SPRING-POWERED BATTERY CHARGING DEVICE

BACKGROUND AND SUMMARY OF THE INVENTION

This invention relates generally to the charging of batteries and deals more particularly with an improved battery charging mechanism.

With recent emphasis on energy conservation, the development of efficient power supplies has taken on increased importance. High efficiency is particularly important with respect to mobile power supplies, primarily because of their widespread use in powering vehicles. The present invention is directed to an improved battery charging mechanism which finds utility in a large number of applications, including the charging of a battery used to power an electrically driven vehicle.

It is an important object of the invention to provide a highly efficient battery charging mechanism which acts to charge a battery while minimizing energy losses.

Another object of the invention is to provide a battery charging mechanism of the character described which is accurately controlled as to its speed and manner of operation.

Still another object of the invention is to provide, in a battery charging mechanism of the character described, a drive spring which has its tension automatically maintained within a predetermined range.

A further object of the invention is to provide a battery charging mechanism of the character described in which a portion of the output power is used to maintain the tension of the drive spring.

An additional object of the invention is to provide a battery charging mechanism of the character described which is simple and economical to construct and reliable in operation.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a top plan view of a battery charging mechanism constructed according to a preferred embodiment of the present invention, with the upper frame plate removed and portions broken away for illustrative purposes; and FIG. 2 is a side plan view of the battery charging mechanism shown in FIG. 1.

Referring now to the drawing in detail, reference numeral 10 generally designates the battery charging device of the present invention. The frame of the device includes a flat base plate 12 and a flat top plate 14 which is located above and parallel to plate 12. The frame plates 12 and 14 may be mounted to a battery powered device such as a vehicle driven by an electric engine (not shown).

The battery charging device 10 is driven by a large coil spring 16 (FIG. 1) which is arranged in convoluted fashion within a circular housing 18. The outer end of spring 16 is connected with the spring housing 18, and the inner end of the spring is connected with a sleeve 20 which is fit loosely over a vertical shaft 22. The shaft is supported for rotation by bearings 24 mounted to the frame plates 12 and 14, while sleeve 20 is able to turn about the shaft. A large gear wheel 26 is connected rigidly with shaft 22 and is integral with the bottom of the spring housing 18. It is to be noted that rotation of gear 26 in the appropriate direction acts to wind up spring 16 since the outer end of the spring is rotated with respect to the inner end in a manner to increase the spring tension, thereby increasing the extent to which the spring is coiled. Uncoiling of the spring effects rotation of sleeve 20 about the axis of shaft 22.

Carried on sleeve 20 is a large gear 28 which mates with and drives a small pinion 30. When spring 16 uncoils, gear 28 is driven in the direction indicated by the directional arrow in FIG. 1. The pinion 30 is rigid with a large gear 32 which is pinned at 34 to a vertical shaft 36. Bearings 38 mounted to the frame plates 12 and 14 support shaft 36 for rotation. Gear 32 in turn drives a pinion 40 which is rigid with a wheel 42 having relatively widely spaced teeth 42a on its periphery (FIG. 1). Pinion 40 and wheel 42 are connected at 44 to a shaft 46 which is rotatively supported by bearings 48 mounted to the frame plates 12 and 14. The teeth 42a are beveled on their outer edges, as best shown in FIG. 1.

The rotation of wheel 42 is controlled by a lever 50 which is connected at 52 to a vertical shaft 54. The shaft 54 is supported by bearings 56, and lever 50 is thus able to pivot about the axis provided by the shaft. Lever 50 is in the general shape of a "Y", having at one end a pair of diverging legs 50a and 51a. These legs carry vertical pins 50b and 51b at their ends. The pins 50b and 51b interact with the teeth 42a of wheel 42 in a manner that will be explained in greater detail. Preferably, a rubber sleeve or the like is fit over each pin to reduce the noise.

The end of lever 50 opposite the legs is forked in a manner to present a notch 58. The notch 58 receives a small vertical pin 60 which is carried on a wheel 62 mounted on a vertical shaft 64. The latter is supported for rotation by bearings 66 mounted to plates 12 and 14. It is noted that pin 60 is offset from shaft 64.

Wheel 62 pivots in reciprocating fashion under the influence of a small coil spring 68. The outer end of spring 68 is connected to a stationary post 70 mounted to plate 12, while the inner end of the spring is connected with a collar 72 mounted on shaft 64. Spring 68 acts to pivot shaft 64 and wheel 62 back and forth as the spring is displaced from its stable position in a manner to place it alternately under tension and compression.

A pair of links 74 and 76 are pivoted at one end to lever 50 by a common pivot pin 78. At their outer ends, links 74 and 76 are pivoted to respective bevel gears 80 and 82 by pins 84 and 86. The pins 84 and 86 are offset from central shafts 88 (see FIG.1) on which gears 80 and 82 are mounted. Bearings 90 (FIG. 2) mounted on plate 12 support shafts 88 for rotation.

The respective gears 80 and 82 drive mating bevel gears 92 and 94 which are carried on horizontal shafts 96 and 98. The shafts 96 and 98 drive conventional alternators 100 and 102 through magnetic clutches 104 and 106. The alternators 100 and 102 have wires 108 and 110 which lead to respective voltage regulators 112 and 114. The current provided by the alternators is delivered through the voltage regulators and through wires 116 and 118 that lead to connection with a large battery 120 mounted on plate 12. The output current of the alternators is thus used to charge the battery.

It is contemplated that battery 120 may be employed to supply power to an electric engine (not shown) such as that used to drive an electrically powered vehicle. It is to be understood, however, that the battery may also be used in other applications and for other purposes. Battery cables 122 lead from the battery terminals 124 and are adapted for connection with the engine or other device which the battery is to power.

A clamp type brake 126 acts on gear 32 to stop the gear train when battery 120 is in the fully charged condition. The brake 126 has wires 128 which extend to the battery and which deliver current for activating the brake. It is contemplated that a sensing device (not shown) will be provided to detect when the battery is fully charged and to activate brake 126 accordingly.

The drive spring 16 is wound up by a conventional electric motor 130 which acts through a transmission or speed reducer 132. The latter drives an output shaft 134 which carries a worm gear 136 in mesh with gear 26. Motor 130 receives current from battery 120 through wires 138 that extend from the battery to the motor.

A pair of switches 140 and 142 form part of the circuit which includes battery 120 and motor 130. The switches are mounted on the spring housing 18 and are controlled by a switch actuator in the form of a pin 144 connected with spring 16. Pin 144 is preferably mounted on one of the outer convolutes of the spring so that it moves inwardly and outwardly as the spring is wound up and down, respectively. Pin 144 projects upwardly through a slot 146 formed in the top of the spring housing 18. When the spring has uncoiled sufficiently to relax its tension below a preselected level, pin 144 moves out into contact with switch 140 (see FIG. 1), which effects completion of the circuit from battery 120 to motor 130. The motor is thereby energized to wind up the spring. When the spring has been wound up sufficiently to move pin 144 inwardly against switch 142, the latter breaks the circuit to thereby deenergize motor 130. Consequently, the tension of spring 16 is maintained within limits which depend on the locations of the switches 140 and 142.

In operation, brake 126 is normally disengaged so that the gear train is driven as spring 16 uncoils. Wheel 42 is rotated intermittently under the control of lever 50. With pin 50b engaged against one of the teeth 42a, wheel 42 is held agaist rotation as shown in FIG. 1. However, the force of spring 68 causes wheel 62 to rotate in a clockwise direction so that pin 60 enters notch 58. Continued movement of pin 60 pivots lever 50 counterclockwise about the axis provided by shaft 54 in order to disengage pin 50b from the tooth 42a and allow wheel 42 to rotate. Soon thereafter, the pin 51b carried on the other leg 51a is moved against one of the teeth 42a to again halt rotation of wheel 42. At this time, spring 68 is displaced in an opposite direction; consequently, it turns wheel 62 counterclockwise such that pin 60 enters notch 58 and acts to pivot lever 50 back in a clockwise direction. Pin 51b is then disengaged from tooth 42a to permit wheel 42 to rotate another short increment before pin 50b is again engaged with the wheel.

In this fashion, lever 50 is reciprocated back and forth about its pivot axis to control the rotation of wheel 42. Both the wheel and lever are controlled such that their motion is periodical. It is noted that the beveled teeth 42a apply impulses to legs 50a and 51a each time they release from the teeth. This action helps to maintain lever 50 in constant motion in cooperation with spring 68.

The reciprocating pivotal movement of lever 50 is imparted to links 74 and 76, which act in the manner of cranks to rotate gears 80 and 82 in the directions indicated by the arrows in FIG. 1. The resultant driving of alternators 100 and 102 produces electric current which is applied as charging current to battery 120. The mechanism continues to operate until the battery is fully charged, at which time brake 126 is automatically applied in order to stop the gears and prevent spring 16 from winding down unduly.

Each time spring 16 winds down or uncoils sufficiently for pin 144 to contact switch 140, motor 130 is automatically energized to begin rewinding of the spring. This continues until the spring is fully wound, at which time pin 144 contacts switch 142 to automatically deenergize the motor. It is important to recognize that energy losses are kept to the minimum since friction losses in the gear train and linkage are relatively small. Consequently, high efficiency is attained and the battery is highly effective in providing power to drive an electric engine or the like.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A mechanism for applying charging current to a battery, said mechanism comprising:

a frame;

a coil spring mounted on said frame for coiling and uncoiling movement, said spring presenting a plurality of convolutions coiled about a center of the spring;

a drive gear mounted for rotation on said frame and coupled with said coil spring in a manner to rotate in response to uncoiling of said spring;

a mechanical linkage coupled with and driven by said drive gear;

battery charging means driven by said linkage and operable to apply charging current to the battery;

power means for winding up said coil spring;

a switch actuator carried on one of the convolutions of said coil spring in projection therefrom, said switch actuator moving with said one convolution along a generally linear path toward and away from the center of said spring as said spring coils and uncoils;

first and second switches for said power means mounted on said frame at spaced locations along said path and operable when engaged by said switch actuator to respectively energize and deenergize said power means, said first switch being located to be engaged by said actuator when said spring has uncoiled below a first preselected tension level and said second switch being located to be engaged by said actuator when said spring has been wound up above a second preselected tension level greater than said first level, whereby said spring is maintained between said first and second tension levels.

2. A mechanism as set forth in claim 1, wherein said linkage includes:

a toothed wheel mounted for rotation on the frame and driven rotatively in response to rotation of said drive gear;

a lever pivotally mounted on the frame and coupled with said battery charging means in a manner to drive same in response to reciprocating pivotal movement of said lever;

an end portion of said lever engageable with the teeth of said wheel to hold the latter against rotation; and biasing means acting on said lever to effect reciprocating pivotal movement thereof in a manner to intermittently move said end portion into and out of engagement with said toothed wheel, thereby controlling the rotation of said wheel.

3. A mechanism as set forth in claim 2, including:

a gear wheel supported for rotation on the frame and drivingly coupled with said battery charging means; and a rigid link having one end pivotally connected with said lever offset from the pivot axis thereof and an opposite end connected with said gear wheel offset from the rotational axis thereof, said link effecting rotation of said gear wheel in response to reciprocating pivotal movement of said lever.

4. A mechanism as set forth in claim 2, wherein said end portion of the lever includes a pair of spaced apart leg portions arranged such that each leg portion is engageable with the teeth of said toothed wheel when the other leg portion is disengaged therefrom.

5. A mechanism as set forth in claim 2, wherein said biasing means comprises:

a control member mounted on said frame for reciprocating pivotal movement in opposite directions;

a spring coupled with said control member in a manner to reciprocate same in opposite pivotal directions as the spring is alternately displaced in opposite directions from a stable condition; and means carried on said control member offset from the pivot axis thereof for intermittently engaging said lever to effect reciprocating pivotal movement thereof.

* * * * *